United States Patent
Okoba et al.

(10) Patent No.: US 12,352,731 B2
(45) Date of Patent: Jul. 8, 2025

(54) AUTOSAMPLER FOR CHROMATOGRAPH AND FLUID CHROMATOGRAPHY SYSTEM

(71) Applicant: SHIMADZU CORPORATION, Kyoto (JP)

(72) Inventors: Tsutomu Okoba, Kyoto (JP); Shohei Sato, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 517 days.

(21) Appl. No.: 17/423,159

(22) PCT Filed: Jan. 17, 2019

(86) PCT No.: PCT/JP2019/001214
§ 371 (c)(1),
(2) Date: Jul. 15, 2021

(87) PCT Pub. No.: WO2020/148853
PCT Pub. Date: Jul. 23, 2020

(65) Prior Publication Data
US 2022/0128520 A1    Apr. 28, 2022

(51) Int. Cl.
*G01N 30/24* (2006.01)
*G01N 27/22* (2006.01)
(Continued)

(52) U.S. Cl.
CPC .............. *G01N 30/24* (2013.01); *G01N 27/22* (2013.01); *G01N 30/88* (2013.01);
(Continued)

(58) Field of Classification Search
CPC ........ G01N 33/24; G01N 27/22; G01N 30/88; G01N 35/00584; G01N 35/1081; G01N 2030/027
(Continued)

(56) References Cited

U.S. PATENT DOCUMENTS 5,005,434 A    4/1991    Watanabe
2020/0033302 A1    1/2020    Yasunaga

FOREIGN PATENT DOCUMENTS

JP    02-061557 A    3/1990
JP    H0261557 A *    3/1990
(Continued)

OTHER PUBLICATIONS

JP H0261557 (Year: 1990).*
(Continued)

*Primary Examiner* — Peter J Macchiarolo
*Assistant Examiner* — Rodney T Frank
(74) *Attorney, Agent, or Firm* — Renner, Otto, Boisselle & Sklar, LLP

(57) ABSTRACT

In a sucking operation, predetermined amount of a sample is sucked by using a needle from a sample container in which the sample to be analyzed is contained. A sensor circuit, which is electrically conducted to the needle, outputs different levels of signals when a tip of the needle is in contact with liquid and when the tip of the needle is not in contact with liquid. A liquid-contacting detector detects whether the tip of the needle is in air or in liquid by comparing a sensor signal value obtained from a signal output from the sensor circuit during the sucking operation with a preset threshold value. An empty container determiner determines that the sample container is empty when the liquid-contacting determiner detects a change during the sucking operation that the tip of the needle is changed from being in liquid to being in air.

17 Claims, 3 Drawing Sheets

(51) Int. Cl.
  *G01N 30/88* (2006.01)
  *G01N 35/00* (2006.01)
  *G01N 35/10* (2006.01)
  *G01N 30/02* (2006.01)

(52) U.S. Cl.
  CPC ... *G01N 35/00584* (2013.01); *G01N 35/1081* (2013.01); *G01N 2030/027* (2013.01); *G01N 2030/8804* (2013.01)

(58) Field of Classification Search
  USPC .................................................. 73/61.55
  See application file for complete search history.

(56) References Cited

FOREIGN PATENT DOCUMENTS

| | | |
|---|---|---|
| WO | 2017/006410 A1 | 1/2017 |
| WO | 2018/155117 A1 | 8/2018 |

OTHER PUBLICATIONS

Office Action for corresponding JP Application No. 2020-566038 dated Feb. 8, 2022, with English machine translation.
International Search Report for corresponding Application No. PCT/JP2019/001214, mailed Apr. 9, 2019.
Written Opinion for corresponding Application No. PCT/JP2019/001214, mailed Apr. 9, 2019 (machine English translation).

\* cited by examiner

F I G. 2
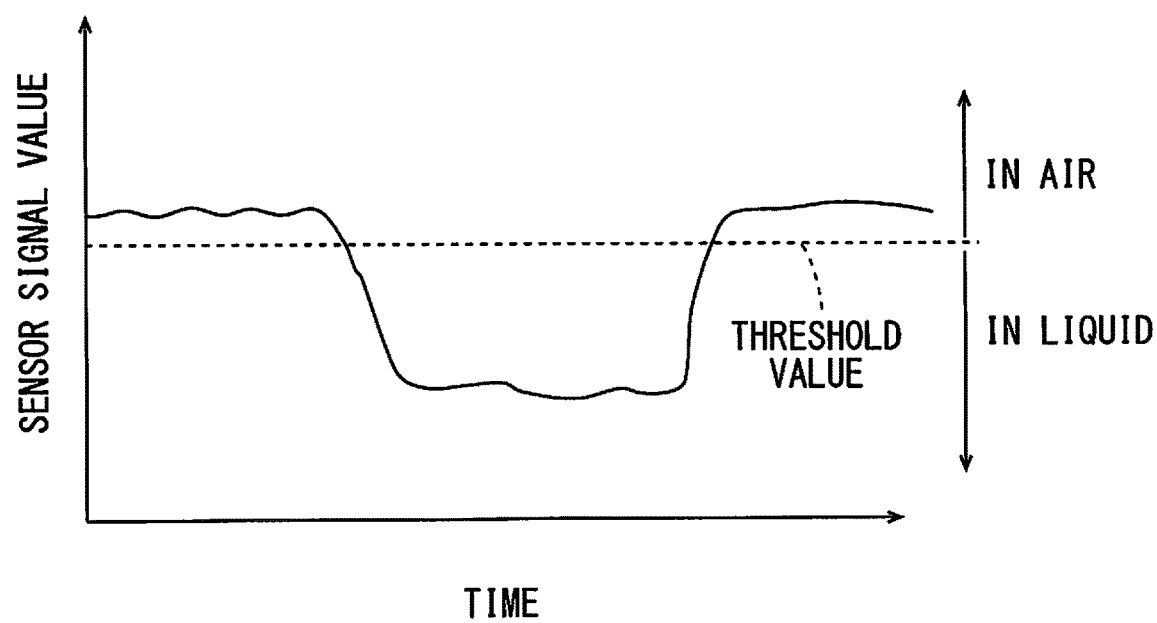

AUTOSAMPLER FOR CHROMATOGRAPH AND FLUID CHROMATOGRAPHY SYSTEM

TECHNICAL FIELD

The present invention relates to an autosampler for a chromatograph and fluid chromatography system.

BACKGROUND ART

An analysis system for performing liquid chromatography or supercritical fluid chromatography generally includes an autosampler that automatically injects a sample into an analysis flow path at which a separation column or a detector is provided. The autosampler includes a sampling needle that is movable in a horizontal direction and a vertical direction, a pump for sucking a sample through the needle, a sample loop for retaining the sample sucked from a tip of the needle and a switch valve for switching between a state in which the sample loop is interposed in an analysis flow path and a state in which the sample loop is not interposed in the analysis flow path (see Patent Document 1).

When an instruction for starting an analysis is transmitted from a management device of a chromatography system to the autosampler, the autosampler moves the needle to a position above a sample container in which a sample to be analyzed is contained, inserts its tip into the sample container, sucks the sample to be analyzed, and then inserts the needle into an injection port. Thereafter, the configuration of a flow path is switched by the switch valve, the sample loop retaining the sample is interposed in the analysis flow path and the sample retained by the sample loop is injected into the analysis flow path.

CITATION LIST

Patent Document

[Patent Document 1] WO 2017/006410 A1

SUMMARY OF INVENTION

Technical Problem

With chromatography, the user requests to inject a total amount of a sample that is to be analyzed and is contained in a sample container for an analysis without calculating and inputting a sample injection amount. In this case, the autosampler is required to know an amount of sample contained in the sample container.

Conventionally, a liquid level of a sample contained in a sample container has been detected with the use of a capacitance sensor. However, a cross sectional area of the sample container is required to be known in order to obtain an amount of sample contained in the sample container from the liquid level of the sample. Further, in a case where the cross sectional area of the sample container is not uniform in a height direction, an accurate amount of sample cannot be calculated.

In a case where not being able to accurately know an amount of sample in the sample container, the autosampler may perform suction from a tip of a needle even though a sample is not present in the sample container and inject air into an analysis flow path. When air is injected into the analysis flow path, air may pass through the separation column, and a crack may be generated in part of a filler of the separation column. Therefore, retention performance of the separation column may be degraded. Further, in a case where the autosampler cannot accurately know an amount of sample in the sample container, the autosampler may end suction of a sample even when a sample remains in the sample container, and there may be a problem that a remaining sample is wasted.

As such, an object of the present invention is to enable accurate and automatic acquisition of knowledge in regard to whether a sample is present in a sample container.

Solution to Problem

An autosampler according to the present invention for a chromatograph includes a sampling needle, a moving mechanism for moving the needle in a horizontal direction and a vertical direction, a pump that sucks a sample through the needle, a sensor circuit that is electrically conducted to the needle and outputs different levels of signals when a tip of the needle is in contact with liquid and when the tip of the needle is not in contact with liquid, a controller configured to control operations of the moving mechanism and the pump in order to perform a sucking operation of sucking a predetermined amount of a sample by using the needle from a sample container in which the sample to be analyzed is contained, a liquid-contacting detector configured to detect whether the tip of the needle is in air or in liquid by comparing a sensor signal value obtained from a signal output from the sensor circuit during the sucking operation with a preset threshold value, and an empty container determiner configured to determine that the sample container is empty when the liquid-contacting determiner detects a change during the sucking operation that the tip of the needle is changed from being in liquid to being in air.

Advantageous Effects of Invention

An autosampler according to the present invention for a chromatograph includes a sensor circuit that outputs different levels of signals when a tip of a needle is in contact with liquid and when the tip of the needle is not in contact with liquid, a liquid-contacting detector configured to detect whether the tip of the needle is in air or in liquid with the use of a signal output from the sensor circuit and an empty container determiner configured to determine that a sample container is empty when the liquid-contacting detector detects a change that the tip of the needle changes from being in liquid to being in air during a sucking operation. Therefore, knowledge in regard to whether a sample is in a sample container can be automatically and accurately acquired.

BRIEF DESCRIPTION OF THE DRAWINGS

FIG. 2 A graph showing the relationship between a position of a needle and a sensor signal value in the same inventive example.

DESCRIPTION OF EMBODIMENTS

Figure 1:
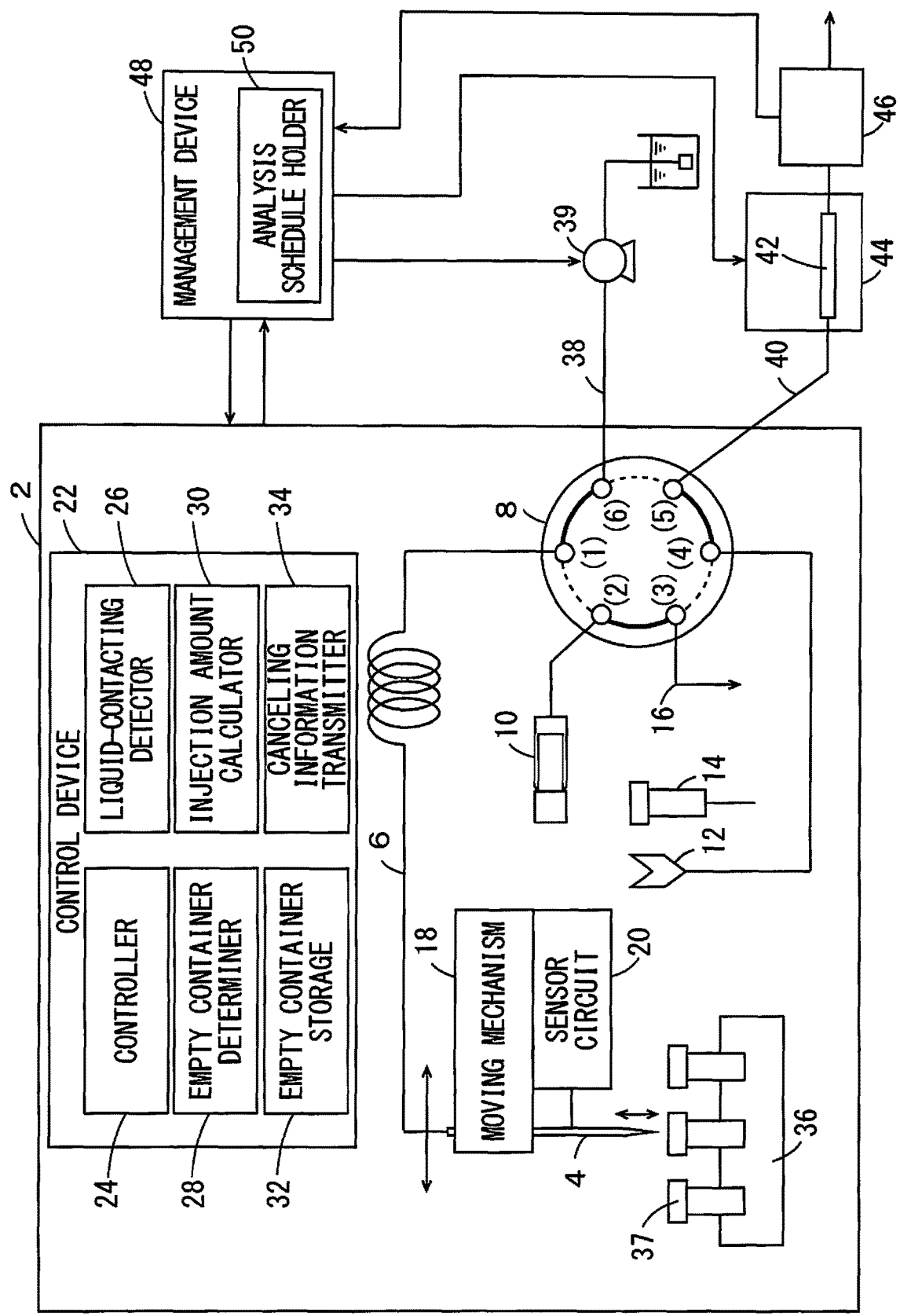
FIG. 1 A schematic diagram showing the configuration of one inventive example of an autosampler for a chromatograph that constitutes a liquid chromatography system.

One inventive example of an autosampler for a chromatograph and one inventive example of a liquid chromatography system including the autosampler will be described below with reference to the drawings. While the liquid chromatography system is described below by way of example, the present invention can also be similarly applied to a supercritical fluid chromatography system.

The liquid chromatography system includes the autosampler 2, a liquid sending pump 39, a separation column 42 and a detector 46.

The autosampler 2 mainly includes a sampling needle 4, a sample loop 6, a switch valve 8, a pump 10, an injection port 12, a moving mechanism 18, a sensor circuit 20 and a control device 22.

The needle 4 is to suck a sample from a sample container 37 on a rack 36 provided at a predetermined position in the autosampler 2 and inject the sample into an analysis flow path 40. A plurality of sample containers 37 are placed on the rack 36. The needle 4 is moved in a horizontal direction and a vertical direction by the moving mechanism 18 with its tip directed vertically downward, thereby being able to suck a sample from a desired sample container 37 placed on the rack 36 and inject the sample into the injection port 12. One end of the sample loop 6 is fluidically connected to the base of the needle 4. The sample loop 6 is a flow path for retaining a sample sucked from the tip of the needle 4. The other end of the sample loop 6 is fluidically connected to one port (1) of the switch valve 8.

The switch valve 8 is to switch the configuration of a flow path, and a six-port valve is used in this inventive example. In addition to the sample loop 6, the syringe pump 10, the injection port 12, a drain flow path 16, a mobile phase supply flow path 38 and the analysis flow path 40 are connected to ports of the switch valve 8. The mobile phase supply flow path 38 is a flow path through which a mobile phase is supplied by the liquid sending pump 39. The analysis flow path 40 is a flow path at which the separation column 42 and the detector 46 are provided. The separation column 42 is contained in a column oven 44 and adjusted to have a predetermined temperature.

The switch valve 8 can switch to one of a state where the mobile phase supply flow path 38 and the analysis flow path 40 are directly connected (a state where ports (5) and (6) communicate with each other) and a state where the sample loop 6 and the needle 4 are interposed between the mobile phase supply flow path 38 and the analysis flow path 40 (a state where ports (1) and (6) communicate with each other, ports (2) and (3) communicate with each other, and ports (4) and (5) communicate with each other in FIG. 1).

The syringe pump 10 is to suck a sample through the needle 4 and is provided to fluidically communicate with the needle 4 through the sample loop 6 with the use of the switch valve 8.

The injection port 12 fluidically communicate with one port of the switch valve 8 and is to guide a sample sucked from the tip of the needle 4 and retained in the sample loop 6 to the analysis flow path 40.

A cleaning port 14 for cleaning the needle 4 is provided in a movement range of the needle 4.

The sensor circuit 20 is a circuit configured to be electrically conducted to the needle 4 and output different levels of signals when the needle 4 is in contact and when the needle 4 is not in contact with liquid. In this inventive example, a circuit that outputs a signal (resonance frequency, for example) based on capacitance between the tip of the needle 4 and a liquid surface is used as the sensor circuit 20.

The control device 22 is to control an operation of the autosampler 2. The control device 22 can be realized by an electronic circuit board provided in the autosampler 2. The control device 22 includes a controller 24, a liquid-contacting detector 26, an empty container determiner 28, an injection amount calculator 30, an empty container storage 32 and a canceling information transmitter 34. The controller 24, the liquid-contacting detector 26, the empty container determiner 28, the injection amount calculator 30 and the canceling information transmitter 34 are functions obtained by execution of a program by a Central Processing Unit (CPU) provided in the control device 22. The empty container storage 32 is a function implemented by part of a storage area in a storage device provided in the control device 22.

The controller 24 is configured to control the operations of the switch valve 8, the pump 10 and the moving mechanism 18 and perform a sucking operation of sucking a predetermined amount of sample from a sample container 37 in which the sample to be analyzed is contained using the needle 4 and an injecting operation of injecting the sample that is sucked by the sucking operation and retained in the sample loop 6 into the analysis flow path 40.

The liquid-contacting detector 26 is configured to determine whether the tip of the needle 4 is in air or in liquid by comparing a sensor signal value obtained by a signal that is output from the sensor circuit 20 with a preset threshold value. Specifically, as shown in FIG. 2, the liquid-contacting detector 26 determines that the tip of the needle 4 is in air when a sensor signal value exceeds the threshold value, and determines that the tip of the needle 4 is in liquid when a sensor signal value is equal to or smaller than the threshold value.

Here, although a "sensor signal value" may be a signal itself that is output from the sensor circuit 20, a moving average value of signals that are output from the sensor circuit 20 may be used as a "sensor signal value" for removal of electromagnetic noise caused by electromagnetic waves with respect to the needle 4. A moving average value is an average value of a predetermined number of latest signal values that are output from the sensor circuit 20. Further, it is possible to use an average value of signal values, excluding the largest and smallest values, among a predetermined number of latest signal values that are output from the sensor circuit 20 as a "sensor signal value" in order to reduce the influence by electromagnetic noise. For example, in a case where five latest signal values that are output from the sensor circuit 20 are used, the average value of three signal values, excluding the largest and lowest values, among the five signal values is used as a "sensor signal value."

In order to reliably prevent erroneous detection caused by electromagnetic noise, the liquid-contacting detector 26 can be configured to determine that the tip the needle 4 is in air or in liquid, in a case where sensor signal values successively exceed the threshold value multiple times or are successively equal to or smaller than the threshold value multiple times.

While a "threshold value" used for determination in regard to whether the tip of the needle 4 is in air or in liquid may be a certain value that is prepared in advance, a value smaller than a sensor signal value obtained when the tip of the needle 4 is in air by a certain value or by a certain ratio may be used as the threshold value.

Here, although the capacitance value between the tip of the needle 4 and a liquid surface is increased by contact of the tip of the needle 4 with the liquid surface, a signal value that is output from the sensor circuit 20 does not necessarily have such a relationship. In the example of FIG. 2, a sensor signal value is decreased when the tip of the needle 4 is in contact with liquid. This is because the sensor circuit 20 converts the capacitance value between the tip of the needle 4 and a liquid surface into resonance frequency for output.

The empty container determiner 28 is configured to determine that a sample container 37 is empty when the liquid-contacting detector 26 detects the tip of the needle 4 changing from being in liquid to being in air during an operation of sucking a sample in the sample container 37. Further, the empty container determiner 28 is configured to determine that a sample container 37 is empty when the liquid-contacting detector 26 detects the tip of the needle 4 being in air even when the needle 4 is lowered to a position close to a bottom surface of the sample container 37. Information about a sample container 37 that is determined to be empty by the empty container determiner 28 is stored in the empty container storage 32.

The controller 24 is configured to stop an operation of the pump 10, interrupt a sucking operation and inject a sucked sample into the analysis flow path 40 when the empty container determiner 28 determines that a sample container is empty during the operation of sucking the sample.

In a case where an operation of sucking a sample is interrupted as described above, the injection amount calculator 30 is configured to calculate an amount of sample that have been injected into the analysis flow path 40 by a subsequent injecting operation with the use of a driving amount of the pump 10 during the sucking operation. The sample injection amount calculated by the injection amount calculator 30 may be output together with analysis result data in regard to a sample. That is, the sample injection amount calculated by the injection amount calculator 30 may be transmitted to a management device 48, described below, and may be added to an analysis report created by the management device 48.

Here, the management device 48 has a function for managing operations of the autosampler 2, the liquid sending pump 39 and the column oven 44 and has a function for executing various calculation processes using a detection signal obtained by the detector 46. The management device 48 is realized by a general personal computer or a dedicated computer. The management device 48 includes an analysis schedule holder 50 that holds a preset analysis schedule, transmits an instruction for starting an analysis in accordance with the analysis schedule and starts chromatography.

The controller 24 performs an operations of sucking a sample and an operation of injecting the sample in response to an instruction for starting an analysis issued by the management device 48 of the liquid chromatography system. The controller 24 is configured to identify whether a subject sample container 37 is empty based on information stored in the empty container storage 32 before starting the operation of sucking a sample. Further, the controller 24 stops the operation of sucking a sample and the operation of injecting the sample in a case where the subject sample container 37 is empty. Further, in a case where information representing that the subject sample container 37 is empty is not in the empty container storage 32, the controller 24 starts the operation of sucking a sample. Although a sucking operation is started, in a case where the liquid-contacting detector 26 does not detect the tip of the needle 4 being in contact with liquid even when the tip of the needle 4 is lowered to a position close to the bottom surface of a subject sample container 37, the empty container determiner 28 determines that the sample container 37 is empty. At this time, the controller 24 cancels the operation of sucking a sample and the operation of injecting the sample. In this manner, because a sucking operation or an injecting operation is not performed when a subject sample container 37 is empty, introduction of air into the separation column 42 is prevented.

Here, in a case where a sucking operation is canceled after the tip of the needle 4 is lowered to a position near the bottom surface of a sample container 37, the needle 4 may become contaminated due to a sample adhering to a septum when the needle 4 penetrates the septum closing the upper surface of the sample container 37. Therefore, in a case where a sucking operation is canceled after the tip of the needle 4 is lowered to a position close to the bottom surface of a sample container 37, the controller 24 may be configured to clean the needle 4 in the cleaning port 14 before an operation of sucking a sample to be analyzed next is performed.

When the controller 24 cancels an operation of sucking a sample and an operation of injecting the sample because a subject sample container 37 is empty, the canceling information transmitter 34 is configured to transmit canceling information representing that the operation of sucking a sample to be analyzed and the operation of injecting the sample to be analyzed are canceled.

In a case where canceling information is transmitted from the autosampler 2 to the management device 48, the management device 48 skips an analysis of a sample for which a sucking operation and an injecting operation are canceled in the autosampler 2 and transmits an instruction for starting an analysis in regard to a sample scheduled to be analyzed next to the autosampler 2. Thus, an analysis operation is not to be performed wastefully even in a case where a sample to be analyzed is not injected.

Figure 3:
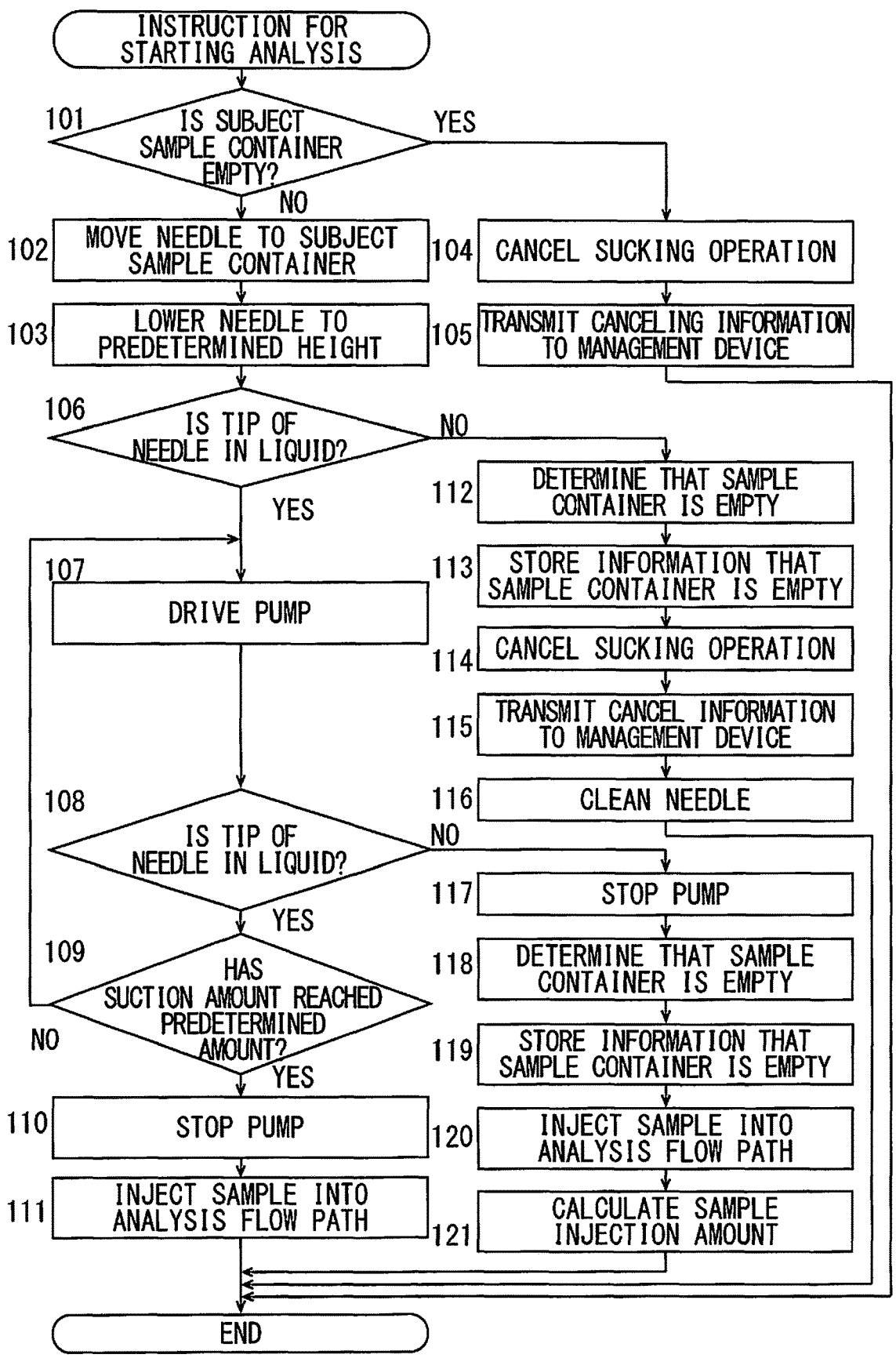
FIG. 3 A flowchart for explaining one example of an operation of the same inventive example.

One example of the operation of the autosampler 2 of this inventive example will be described with reference to FIG. 1 and a flowchart of FIG. 3.

When receiving an instruction for starting an analysis from the management device 48, the controller 24 identifies whether a subject sample container 37 is empty based on information stored in the empty container storage 32 (step 101). In a case where information representing that the subject sample container 37 is empty is not present in the empty container storage 32, the controller 24 moves the needle 4 to a position above the subject sample container 37 (step 102) and lowers the tip of the needle 4 to a predetermined height close to the bottom surface of the sample container 37 (step 103). At this time, in a case where the liquid-contacting detector 26 detects the tip of the needle 4 being in liquid, the controller 24 drives the pump 10 and starts suction of a sample (steps 106 and 107).

On the other hand, in a case where the information representing that the subject sample container 37 is empty is in the empty container storage 32, the controller 24 cancels a scheduled operation of sucking a sample and a scheduled operation of injecting the sample (step 104), and the canceling information transmitter 34 transmits canceling information to the management device 48 (step 105). Thus, in the management device 48, a scheduled analysis of sample in accordance with an analysis schedule is skipped, and an instruction for starting an analysis in regard to a sample that is scheduled to be analyzed next is transmitted from the management device 48 to the autosampler 2.

In a case where suction of the sample is started because the subject sample container 37 is not empty (step 107), the liquid-contacting detector 26 detects whether the tip of the needle 4 is in liquid or in air also during the sucking operation. In a case where an amount of sucked sample reaches a predetermined amount with the tip of the needle 4 in liquid (step 109), the controller 24 stops the operation of the pump 10 (step 110) and injects the sucked sample into the analysis flow path 40 (step 111). Thereafter, the needle 4 is cleaned, and the process waits until a next instruction for starting an analysis is supplied from the management device 48.

Although information representing that the subject sample container 37 is empty is not present in the empty container storage 32, in a case where the liquid-contacting detector 26 detects the tip of the needle 4 being in air when the tip of the needle 4 is lowered to a predetermined height close to the bottom surface of the sample container 37, the empty container determiner 28 determines that the sample container 37 is empty (steps 106 and 112). Information about the sample container 37 that is determined to be empty is stored in the empty container storage 32 (step 113). In a case where it is determined that the subject sample container 37 is empty, the controller 24 cancels a scheduled operation of sucking a sample (step 114), and the canceling information transmitter 34 transmits canceling information to the management device 48 (step 115). Thus, in the management device 48, a scheduled analysis of a sample in accordance with an analysis schedule is skipped, and an instruction for starting an analysis in regard to a sample that is scheduled to be analyzed next is transmitted from the management device 48 to the autosampler 2. In the autosampler 2, the needle 4 is cleaned before the controller 24 receives a next instruction for starting an analysis (step 116).

Further, in a case where the liquid-contacting detector 26 detects the tip of the needle 4 being in air during an operation of sucking a sample (step 108), the controller 24 stops an operation of the pump 10 and interrupts the operation of sucking the sample (step 117). At this time, the empty container determiner 28 determines that the subject sample container 37 is empty (step 118). Information about the sample container 37 that is determined to be empty is stored in the empty container storage 32 (step 119). The controller 24 injects the sample sucked by this sucking operation into the analysis flow path 40 (step 120). At this time, the injection amount calculator 30 calculates a sample injection amount based on a driving amount of the pump 10 during this sucking operation (step 121). Thereafter, the needle 4 is cleaned, and the process waits until a next instruction for starting an analysis is supplied from the management device 48.

While the total volume injection type autosampler 2 for injecting a total amount of sample sucked from the tip of the needle 4 into the analysis flow path 40 is described in the above-mentioned inventive example, the present invention is not limited to this. The present invention can be applied to a loop injection type autosampler for injecting a predetermined amount of sample sucked from the tip of the needle 4 into a second sample loop and injecting the predetermined amount of sample into an analysis flow path by connecting the sample loop to the analysis flow path.

An embodiment of an autosampler (2) according to the present invention for a chromatograph includes a sampling needle (4), a moving mechanism (18) for moving the needle (4) in a horizontal direction and a vertical direction, a pump (10) that sucks a sample through the needle (4), a sensor circuit (20) that is electrically conducted to the needle (4) and outputs different levels of signals when a tip of the needle (4) is in contact with liquid and when the tip of the needle (4) is not in contact with liquid, a controller (24) configured to control operations of the moving mechanism (18) and the pump (10) in order to perform a sucking operation of sucking a predetermined amount of a sample by using the needle (4) from a sample container (37) in which the sample to be analyzed is contained, a liquid-contacting detector (26) configured to detect whether the tip of the needle (4) is in air or in liquid by comparing a sensor signal value obtained from a signal output from the sensor circuit (20) during the sucking operation with a preset threshold value, and an empty container determiner (28) configured to determine that the sample container (37) is empty when the liquid-contacting determiner (26) detects a change during the sucking operation that the tip of the needle (4) is changed from being in liquid to being in air.

In a first aspect of the above-mentioned embodiment of the autosampler (2) according to the present invention, the controller (24) is configured to stop an operation of the pump (10) and interrupt the sucking operation when the empty container determiner (28) determines during the sucking operation that a sample container (37) subject to suction is empty. With such an aspect, air can be prevented from being sucked from the tip of the needle (4) and generation of a crack in a filler into which air is introduced in the separation column (42) can be prevented.

In one aspect of the above-mentioned first aspect, the autosampler has an injection port (12) for injecting a sample sucked from the tip of the needle (4) into an analysis flow path (40) for chromatography, wherein the controller (24) is configured to perform an injecting operation of injecting a sample sucked from the tip of the needle (4) into the analysis flow path (40) through the injection port (12) after interrupting the sucking operation. With such an aspect, a total amount of sample contained in the sample container (37) can be injected into the analysis flow path (40).

In the above-mentioned aspect, the autosampler may include an injection amount calculator (30) configured to calculate an amount of a sample injected into the analysis flow path (40) by the injecting operation that is performed after the sucking operation based on a driving amount of the pump (10) during the sucking operation before interruption, when the sucking operation is interrupted. Thus, even in a case where a total amount of sample contained in the sample container (37) is not known, an amount of sample injected into the analysis flow path (40) can be obtained and used as information for determining authenticity of a chromatogram.

In a second aspect of the above-mentioned embodiment of the autosampler (2) according to the present invention, the autosampler (2) further includes an empty container storage (32) that stores information relating to a sample container (37) that is determined to be empty by the empty container determiner (28), wherein the controller (24) is configured to identify whether a sample container (37) in which a sample to be analyzed is to be contained is empty based on information stored in the empty container storage (32) and cancel the sucking operation in a case where the sample container (37) in which the sample to be analyzed is to be contained is empty, when the controller (24) receives an instruction for starting an analysis in regard to the sample from a management device (48) of a chromatography system. With such an aspect, information in regard to the sample container (37) that is detected to be empty by the empty container determiner (28) is held in the autosampler (2), whereby it is possible to quickly identify whether the sample container (37) in which a sample to be analyzed is to be contained is empty with the use of information in regard to an empty container and prevent a sucking operation or an injecting operation from being performed wastefully. This second aspect can be combined with the above-mentioned first aspect.

In one aspect of the above-mentioned second aspect, the empty container determiner (28) may be configured to determine that the sample container (37) in which a sample to be analyzed is to be contained is empty when the liquid-contacting determiner (26) continues to detect the tip of the needle (4) being in air from a time when the sucking operation is started until a time when the tip of the needle (4) is lowered to a predetermined height equivalent to a bottom surface of the sample container (37), and the controller (24) may be configured to cancel the sucking operation in regard to a sample to be analyzed when the empty container determiner (28) determines that the sample container (37) in which the sample to be analyzed is to be contained is empty. With such an aspect, in a case where a sample container (37) in which a sample to be analyzed is to be contained is empty, execution of a sucking operation is canceled. Thus, a sucking operation is not performed wastefully, and an analysis operation in regard to a sample to be analyzed next can be quickly performed in a case where a sample to be analyzed next is present. This improves efficiency of analysis.

As a specific example of the above-mentioned aspect, the autosampler includes a canceling information transmitter (34) configured to transmit canceling information representing that the sucking operation is canceled to the management device (48), when the sucking operation is canceled. Thus, the management device (48) can identify that a sample scheduled to be analyzed is not contained in a predetermined sample container (37) and can skip an analysis of the sample. As a result, an analysis operation can be prevented from being performed wastefully, and this improves efficiency of analysis.

In the above-mentioned specific example, the autosampler may include a cleaning port (14) for cleaning the needle, wherein the controller (24) may be configured to clean the needle (4) in the cleaning port (14) in a case where the empty container determiner (28) determines that the sample container (37) in which a sample to be analyzed is to be contained is empty as a result after the tip of the needle (4) is lowered to the predetermined height. Thus, even in a case where the needle (4) is contaminated by a sample adhering to a septum when the needle (4) penetrates the septum closing the upper surface of the sample container (37), contamination can be prevented by cleaning.

In a third aspect of the above-mentioned embodiment of the autosampler (2) according to the present invention, the sensor circuit (20) is to output a signal based on capacitance between the needle (4) and a liquid level, and the liquid-contacting detector (26) is configured to acquire signals output from the sensor circuit (20) at short time intervals and use an average value of signals excluding a highest value and a lowest value of a predetermined number of latest signals acquired from the sensor circuit (20) as the sensor signal value. Thus, electromagnetic noise caused by electromagnetic waves with respect to the needle (4) can be reduced. This third aspect can be freely combined with the above-mentioned first aspect and/or the second aspect.

In a fourth aspect of the above-mentioned embodiment of the autosampler (2) according to the present invention, the liquid-contacting detector (26) is configured to detect a change that the tip of the needle (4) is changed from being in air to being in liquid or a change that the tip of the needle (4) is changed from being in liquid to being in air, when a sensor signal value exceeds the threshold value and then sensor signal values are successively equal to or smaller than the threshold value multiple times or when a sensor signal value is equal to or smaller than the threshold value and then sensor signal values successively exceed the threshold value multiple times. Thus, electromagnetic noise caused by electromagnetic waves with respect to the needle (4) can be reduced. This fourth aspect can be freely combined with the above-mentioned first aspect, the second aspect and/or the third aspect.

An embodiment of a fluid chromatography system according to the present invention includes a liquid sending pump (39) that sends a mobile phase through an analysis flow path (40), the autosampler (2) that injects a sample into the analysis flow path (40) and includes the configuration of a specific example of one aspect of the above-mentioned second aspect, a separation column (42) that is provided at a position farther downward than the autosampler (2) in the analysis flow path (40) and is to separate a sample injected by the autosampler (2) into components, a detector (46) that is provided at a position farther downward than the separation column (42) in the analysis flow path (40) and to detect sample components obtained by separation by the separation column (42), and a management device (48) that is communicable with at least the liquid sending pump (39) and the autosampler (2), and is configured to transmit an instruction for starting an analysis in regard to a sample to be analyzed to the autosampler (2) such that the sample to be analyzed is analyzed in the analysis flow path (40), when it is time to start the analysis in regard to the sample to be analyzed in accordance with a present analysis schedule. Further, the management device (48) is configured to cancel an analysis in regard to a sample to be analyzed and transmit an instruction for starting an analysis in regard to a sample to be analyzed next to the autosampler (2), when canceling information representing that the sucking operation in regard to the sample to be analyzed is canceled is transmitted from the autosampler (2) to the management device (48) after the management device (48) transmits the instruction for starting the analysis in regard to the sample to be analyzed to the autosampler (2). With this embodiment, although an instruction for starting an analysis is transmitted by the management device (48) to the autosampler (2), in a case where the sample container (37) in which a sample to be analyzed is to be contained is empty, the management device (48) cancels an analysis with respect to the sample to be analyzed in response to receiving canceling information from the autosampler (2). Therefore, it is possible to quickly start an analysis of sample to be analyzed next without performing an analysis wastefully. This improves efficiency of analysis.

REFERENCE SIGNS LIST

2 Autosampler
4 Needle
6 Sample loop
8 Switch valve
10 Pump
12 Injection port
14 Cleaning port
16 Drain flow path
18 Moving mechanism
20 Sensor Circuit
22 Control device
24 Controller
26 Liquid-contacting detector
28 Empty container determiner
30 Injection amount calculator
32 Empty container storage
34 Canceling information transmitter
36 Rack
37 Sample container
38 Mobile phase supply flow path
39 Liquid sending pump 40 Analysis flow path
42 Separation column
44 Column oven
46 Detector
48 Management device
50 Analysis schedule holder

The invention claimed is:

1. An autosampler for a chromatograph comprising:
a sampling needle;
a moving mechanism for moving the needle in a horizontal direction and a vertical direction;
a pump that sucks a sample through the needle;
a sensor circuit that is electrically conducted to the needle and outputs different levels of signals when a tip of the needle is in contact with liquid and when the tip of the needle is not in contact with liquid;
a controller configured to control operations of the moving mechanism and the pump in order to perform a sucking operation of sucking a predetermined amount of a sample by using the needle from a sample container in which the sample to be analyzed is contained;
a liquid-contacting detector configured to detect whether the tip of the needle is in air or in liquid by comparing a sensor signal value obtained from a signal output from the sensor circuit during the sucking operation with a preset threshold value;
an is empty container determiner configured to determine that the sample container empty when the liquid-contacting detector detects a change during the sucking operation that the tip of the needle is changed from being in liquid to being in air;
wherein the controller is configured to stop an operation of the pump and interrupt the sucking operation to prevent air from being sucked into the needle when the liquid-contacting detector detects the change that the tip of the needle is changed from being in liquid to being in air, thereby preventing a generation of a crack in a filler of a separation column of the chromatograph, and the empty container determiner determines that a sample container subject to suction is empty.

2. The autosampler according to claim 1, having an injection port for injecting the sample sucked from the tip of the needle into an analysis flow path for chromatography, wherein the controller is configured to perform an injecting operation of injecting a sample sucked from the tip of the needle into the analysis flow path through the injection port after interrupting the sucking operation.

3. The autosampler according to claim 2, comprising an injection amount calculator configured to calculate an amount of a sample injected into the analysis flow path by the injecting operation that is performed after the sucking operation based on a driving amount of the pump during the sucking operation before interruption, when the sucking operation is interrupted.

4. The autosampler according to claim 2, further comprising an injection amount calculator configured to:
when the empty container determiner determines during the sucking operation that the sample container subject to suction is empty and the operation of the pump is stopped, calculate an amount of a sample injected into the analysis flow path by the injecting operation based on a driving amount of the pump during the sucking operation before interruption.

5. The autosampler according to claim 4, wherein the injection amount calculator is further configured to output the calculated amount of the sample injected into the analysis flow path for determining an authenticity of a chromatogram generated for the injected sample.

6. The autosampler according to claim 2, further comprising:
a sample loop in fluid communication with the sampling needle and configured to retain the sample sucked through the needle; and
a switch valve in fluid communication with the sample loop and the analysis flow path;
wherein the controller performs the injecting operation by injecting the sample retained in the sample loop into the analysis flow path through the injection port after interrupting the sucking operation.

7. The autosampler according to claim 1, further comprising an empty container storage that stores information relating to a sample container that is determined to be empty by the empty container determiner, wherein
the controller is configured to identify whether a sample container in which a sample to be analyzed is to be contained is empty based on information stored in the empty container storage and cancel the sucking operation in a case where the sample container in which the sample to be analyzed is to be contained is empty, when the controller receives an instruction for starting an analysis in regard to the sample from a management device of a chromatography system.

8. The autosampler according to claim 7, wherein
the empty container determiner is configured to determine that the sample container in which a sample to be analyzed is to be contained is empty when the liquid-contacting detector continues to detect the tip of the needle being in air from a time when the sucking operation is started until a time when the tip of the needle is lowered to a predetermined height equivalent to a bottom surface of the sample container, and
the controller is configured to cancel the sucking operation in regard to a sample to be analyzed when the empty container determiner determines that the sample container in which the sample to be analyzed is to be contained is empty.

9. The autosampler according to claim 8, comprising a canceling information transmitter configured to transmit canceling information representing that the sucking operation is canceled to the management device, when the sucking operation is canceled.

10. The autosampler according to claim 9, comprising a cleaning port for cleaning the needle, wherein
the controller is configured to clean the needle in the cleaning port in a case where the empty container determiner determines that the sample container in which a sample to be analyzed is to be contained is empty as a result after the tip of the needle is lowered to the predetermined height.

11. A fluid chromatography system comprising:
a liquid sending pump that sends a mobile phase through an analysis flow path;
the autosampler according to claim 9 that injects a sample into the analysis flow path;
a separation column that is provided at a position farther downward than the autosampler in the analysis flow path and is to separate a sample injected by the autosampler into components;
a detector that is provided at a position farther downward than the separation column in the analysis flow path and to detect sample components obtained by separation by the separation column; and a management device that is communicable with at least the liquid sending pump and the autosampler, and is configured to transmit an instruction for starting an analysis in regard to a sample to be analyzed to the autosampler such that the sample to be analyzed is analyzed in the analysis flow path, when it is time to start the analysis in regard to the sample to be analyzed in accordance with a present analysis schedule, wherein the management device is configured to cancel an analysis in regard to a sample to be analyzed and transmit an instruction for starting an analysis in regard to a sample to be analyzed next to the autosampler, when canceling information representing that the sucking operation in regard to the sample to be analyzed is canceled is transmitted from the autosampler to the management device after the management device transmits the instruction for starting the analysis in regard to the sample to be analyzed to the autosampler.

12. The autosampler according to claim 7, wherein the controller is configured to store in the empty container storage the information relating to the sample container that is determined to be empty:
after stopping the operation of the pump and interrupting the sucking operation; and
before the controller performs an injecting operation of injecting a sample sucked from the tip of the needle into the analysis flow path.

13. The autosampler according to claim 1, wherein
the sensor circuit is to output a signal based on capacitance between the needle and a liquid level, and
the liquid-contacting detector is configured to acquire signals output from the sensor circuit at short time intervals and use an average value of signals excluding a highest value and a lowest value of a predetermined number of latest signals acquired from the sensor circuit as the sensor signal value.

14. The autosampler according to claim 1, wherein
the liquid-contacting detector is configured to detect a change that the tip of the needle is changed from being in air to being in liquid or a change that the tip of the needle is changed from being in liquid to being in air, when a sensor signal value exceeds the threshold value and then sensor signal values are successively equal to or smaller than the threshold value multiple times or when a sensor signal value is equal to or smaller than the threshold value and then sensor signal values successively exceed the threshold value multiple times.

15. The autosampler according to claim 1,
wherein the liquid-contacting detector is configured to detect whether the tip of the needle is in air or in liquid by comparing the sensor signal value obtained from the signal output from the sensor circuit with the preset threshold value also before the sucking operation, and
the controller starts the sucking operation by driving the pump in a case where the liquid-contacting detector detects that the tip of the needle is in liquid before the sucking operation.

16. The autosampler according to claim 1, wherein the signal output by the sensor circuit is a resonance frequency based on a capacitance value measured by the sensor circuit between the needle tip and a surface of the liquid.

17. The autosampler according to claim 1, wherein the sensor signal value used by the liquid-contacting detector is based on a moving average of the signal output from the sensor circuit.

* * * * *